Nov. 24, 1936.　　　　N. H. HASSEL　　　　2,062,026
TILTABLE RUNNING BOARD FOR MOTOR VEHICLES
Filed June 17, 1936
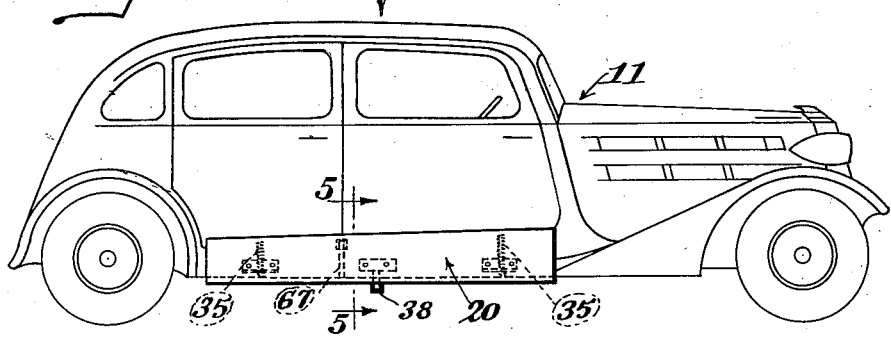
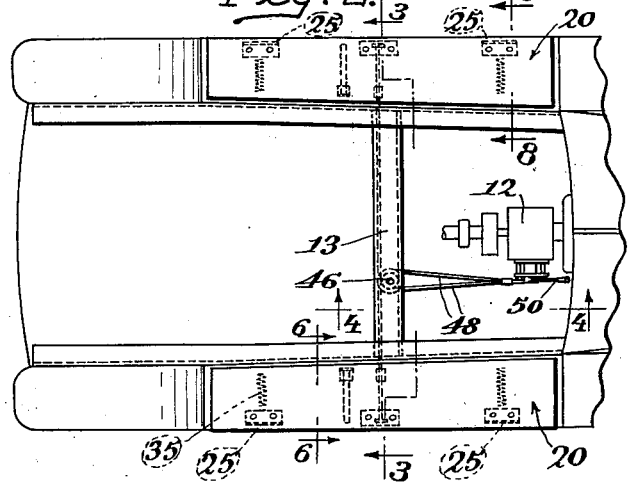
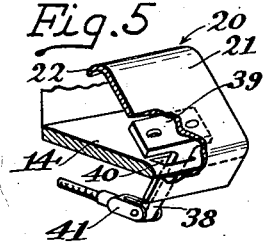
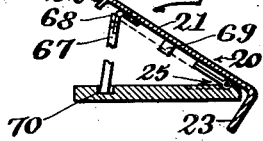
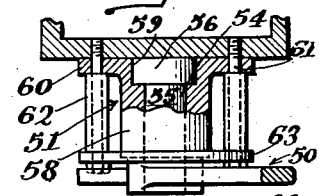
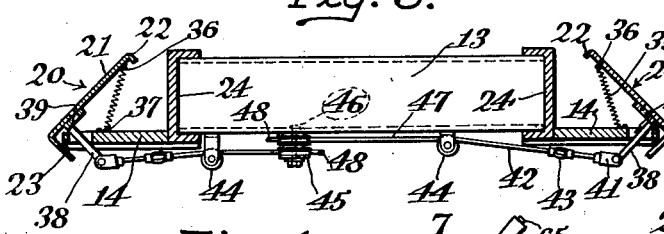
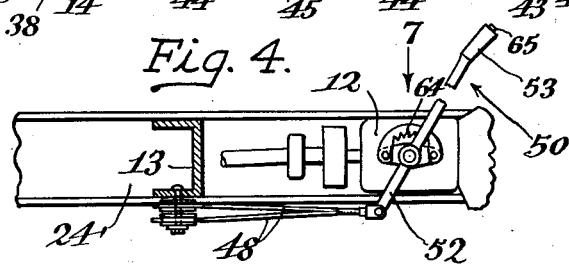
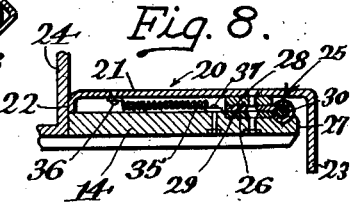
Inventor
Nels H. Hassel
By Hazard and Miller
Attorneys Patented Nov. 24, 1936

2,062,026

UNITED STATES PATENT OFFICE 2,062,026

TILTABLE RUNNING BOARD FOR MOTOR VEHICLES

Nels H. Hassel, Los Angeles, Calif.

Application June 17, 1936, Serial No. 85,704

6 Claims. (Cl. 280—166)

My invention relates to a tiltable running board for a motor vehicle, the main purpose being to prevent a holdup of an automobile by bandits or highwaymen who in some cases make it a practice to crouch on the running board of a vehicle below the windows when a vehicle is starting or moving slowly and then when the occasion suits them, demanding that the driver open the doors to let them in the vehicle or direct the driver to stop at a suitable place for them to rob the driver and passengers. Another object of my invention is to provide a device which when tilted to a verticle or inclined position provides means for holding and retaining articles on the running board. My invention therefore comprehends a covering device on the running board which may be tilted by operating a lever or the like inside the vehicle and thus tilt the board to cause the bandit riding on the running board to be thrown onto the road.

In constructing my invention, I make use of the ordinary running board of a vehicle and attach my device by having a false top for the running board hinged to or adjacent the outer end of the fixed running board. The false board is provided with a lever connected by a cable or the like to an operating lever in the vehicle convenient for operation by the driver which lever on being pulled, tilts the tiltable board into an inclined or a vertical position so that a bandit riding on the board cannot well maintain his position when the false part of the board is tilted and moreover the operation may be done quickly to take the highwayman unawares. The false board is spring connected to the fixed running board in order that it may be returned to its normal travelling position after being tilted upwardly. Should it be desired to position the tiltable board in a vertical or nearly vertical position for carrying articles on the running board, I provide a prop hinge to the false board adjacent its inner edge, which may be loosened to engage the running board and thus hold the tiltable board in a vertical or nearly vertical position.

My invention is illustrated in connection with the accompanying drawing, in which:

Fig. 1 is a side elevation of a typical automobile with my invention attached thereto showing this in its tilted position, such figure may be considered as taken in the direction of the the arrow 1 of Fig. 2.

Fig. 2 is a plan taken in the direction of the arrow 2 of Fig. 1 except that the tiltable boards are shown in their housed or horizontal position covering the fixed or permanent board.

Fig. 3 is a transverse vertical section taken substantially on the line 3—3 of Fig. 2 in the direction of the arrows.

Fig. 4 is a vertical longitudinal section on the line 4—4 of Fig. 2 in the direction of the arrows showing the operating lever in the vehicle and its connections.

Fig. 5 is a perspective view of a portion of the permanent and tiltable board adjacent the operating arm attached to the tiltable board and connected by a cable to the operating lever.

Fig. 6 is a detail transverse section on the line 6—6 of Fig. 2 in the direction of the arrows showing the tiltable board partly tilted and illustrating the prop.

Fig. 7 is a plan taken in the direction of the arrow 7 partly broken away showing the journal mounting for connecting the operating lever to the transmission gear case of the vehicle.

Fig. 8 is a transverse section on the line 8—8 of Fig. 2 in the direction of the arrow, showing the tiltable board in its housed position and the hinge with the retractive spring.

In the drawing, a vehicle is designated by the numeral 11 which has an ordinary transmission gear case 12, a transverse frame member 13 and a permanent or fixed running board 14.

With my invention I employ a tiltable running board 20 which has a normally horizontal running board section 21 with a downturned rim 22 at its inside edge and a larger downturned flange 23 at its outer longitudinal edge. The rim is adapted to engage the inner portion of the permanent running board adjacent the side member 24 of the vehicle and the flange 23 extends downwardly below the running board a sufficient distance to obscure the main portion of the mechanism for tilting such board. Therefore when the tiltable board is in its normal driving position of Figs. 2 and 8, a person would not know that this portion of the board tilted. The upper or tread portion 21 may be covered with rubber or the like, to give the desired finish and provide a wearing surface.

A hinge 25 has one hinge plate 26 secured to the running board preferably fitted in a recess adjacent the outer edge 27 of the board and has an upper plate 28 connected to the underside of the tiltable board. If desired a filling strip 29 may be utilized between the upper plate and the underside of the tread portion of the tiltable board. The knuckle 30 of the hinge is contiguous to the outer edge of the board and the pintle 31 extends longitudinally.

In order to maintain the tiltable board retracted in its housed position and to return it after tilting, a tension spring 35 has one end 36 connected to the tiltable board adjacent the rim 22 and the other end 37 attached to the permanent running board adjacent its outer portion. An operating arm 38 has a flange 39 at its upper end connected to the underside of the tread section of the tiltable board. The arm extends downwardly through a notch or slot 40 in the running board and has a pivoted link 41 connected at its lower end. Secured to this link is a cable 42, this having a turn-buckle 43. The cable passes over a guide pulley 44 preferably secured on the underside of the transverse member 13 and the cable passes over guide pulleys 45 which are mounted on a vertical stub shaft 46 also extending downwardly from the transverse member 13. This construction provides for two transverse leads 47 of the cable and two longitudinal leads 48. The longitudinal leads are connected together and to a pivoted link 49 which is attached to the double lever 50.

This lever has a hub 51 and a lower end 52 to which the link 49 is connected and a long handle end 53. The lever is supported by a pivot shaft 54 which has a cylindrical portion 55 and a head 56, the hub 51 of the lever being secured to the outer end of this pin. The pin is rotatably mounted in a journal bracket 57 which has a sleeve section 58 to accommodate the cylindrical part of the pin and a recess 59 to accommodate the head 56 of the pin. This has flanges 60 through which extend bolts 61, these bolts having a spacer 62 and holding a strap 63 in place. The strap engages the outer end of the sleeve section 58. This is also provided with a ratchet segment 64. The bolts are illustrated as being threaded in the side of the transmission gear case. A push button 65 on the end of the handle 53 allows operation of a pawl 66 for engaging the ratchet teeth 64 to hold the lever in any position to which it may be pulled. The lever normally is inclined forwardly.

In order to hold the tiltable running board in a vertical or steeply inclined position, a prop 67 is hinged at 68 to the underside of the false running board adjacent the downturned rim 22 and is normally held by a clamp 69 closely contiguous to the undersurface of the tread section of the false board. However, it may be moved by hand to have its lower end engage in the socket 70 in the permanent board and thus hold the tiltable board in a steeply tilted or vertical position.

The manner of operating my invention is as follows: Presuming the tiltable board is in its normal housed position of Figs. 2 and 8 and the operating lever 50.

Various changes may be made in the details of the construction without departing from the spirit or scope of the invention as defined by the appended claims.

I claim:

1. In a vehicle having a fixed running board extending horizontally, a tiltable board hinged thereto adjacent the outer portions of the fixed and the tiltable boards, an arm connected to the tiltable board and extending downwardly, a flexible connection from the said arm leading to the interior of the vehicle and an actuating device in the vehicle connected to the flexible means for raising the tiltable board from its housed horizontal to an inclined position, the fixed board having a slot, the arm extending downwardly through the slot, the end of the arm to which the flexible means is connected being below the fixed board.

2. A vehicle having a fixed horizontal running board, a tiltable running board hinged thereto adjacent the outer portions of each of said boards, a retraction tension spring between the said boards maintaining the tiltable board normally housed with its main portion horizontal, an arm attached to the tiltable board and extending downwardly below the fixed board at substantially right angles thereto, a cable connected to the said arm and extending transversely of the vehicle and an operating lever mounted in the vehicle having a connection to the said cable for raising the tiltable board, the said spring being adapted to retract the board to its normal housed position.

3. A vehicle as claimed in claim 2, the tiltable board having a prop hinged thereto, adjacent its inner edge, the free end of the prop being adapted to engage the fixed board and retain the tiltable board in a raised inclined position.

4. A vehicle having a fixed horizontal running board, a tiltable board having a main upper section with a downturned rim on its inner edge and a downturned flange on its outer edge, a hinge connecting the fixed board and the tiltable board connected to the fixed board adjacent its outer edge and the tiltable board slightly inwardly from the said flange, the rim being adapted to engage the fixed board and provide a space between the fixed board and the underside of the tilted board and the tilting means having an operating connection from inside the vehicle to the tilting board.

5. A vehicle as claimed in claim 4, a spring connected to the tilting board adjacent the rim and to the fixed board to retract the tilting board to its housed position.

6. A vehicle as claimed in claim 5, the said operating connection including an arm secured to the tiltable board adjacent the flange, the fixed board having a slot, the arm extending downwardly through the slot, a cable connected to the lower end of the arm having a transverse run partly across the vehicle, a change of direction pulley over which the cable operates, the cable having a longitudinal run and a lever in the vehicle connected to the free end of the cable.

NELS H. HASSEL.